United States Patent
Feria (10) Patent No.: US 11,766,654 B2
(45) Date of Patent: Sep. 26, 2023

(54) METHOD FOR CONTROLLING TEMPERATURE OF A CHEMICAL REACTION

(71) Applicant: Erlan H. Feria, Princeton, NJ (US)

(72) Inventor: Erlan H. Feria, Princeton, NJ (US)

( * ) Notice: Subject to any disclaimer, the term of this patent is extended or adjusted under 35 U.S.C. 154(b) by 36 days.

(21) Appl. No.: 17/625,275

(22) PCT Filed: Sep. 21, 2021

(86) PCT No.: PCT/US2021/051259
§ 371 (c)(1),
(2) Date: Jan. 6, 2022

(87) PCT Pub. No.: WO2023/048698
PCT Pub. Date: Mar. 30, 2023

(65) Prior Publication Data
US 2023/0129615 A1    Apr. 27, 2023

(51) Int. Cl.
*B01J 19/00* (2006.01)
*B01J 8/02* (2006.01)
*B01J 19/30* (2006.01)
*G05D 23/19* (2006.01)

(52) U.S. Cl.
CPC ......... *B01J 19/0013* (2013.01); *B01J 8/0278* (2013.01); *B01J 8/0285* (2013.01); *B01J 19/0033* (2013.01); *B01J 19/30* (2013.01); *G05D 23/1917* (2013.01); *B01J 2208/00097* (2013.01); *B01J 2208/00619* (2013.01); *B01J 2219/00072* (2013.01);
(Continued)

(58) Field of Classification Search
CPC .... B01J 19/0013; B01J 8/0278; B01J 8/0285; B01J 19/0033; B01J 19/30; B01J 2208/00097; B01J 2208/00619; B01J 2219/00072; B01J 2219/00184; B01J 2219/30207; B01J 2219/30408; B01J 2219/30416; B01J 2219/30466; B01J 2219/30433; G05D 23/1917
See application file for complete search history.

(56) References Cited

U.S. PATENT DOCUMENTS

| 4,536,380 A | 8/1985 | Pirkle, Jr. et al. |
| 10,101,445 B2 | 10/2018 | Feria |

(Continued)

OTHER PUBLICATIONS

Feria, Erlan; First Principles of Linger-Thermo Theory, a Time-Complementary Duality in Physics, Inherently Lead to Average Mass of Star Particles and Organism Cells; 234th Meeting of the American Astronomical Society, Jun. 9-13, 2019; 2 pages.

(Continued)

*Primary Examiner* — Shogo Sasaki
(74) *Attorney, Agent, or Firm* — Peter J. Mikesell; Schmeiser, Olsen & Watts, LLP (57) ABSTRACT

A method for controlling temperature of a chemical reaction without measuring a temperature of the chemical reaction. Changes in mass of a chemical reaction are monitored and are used to calculate the temperature of the system. The reaction can be maintained at a desired temperature (T) without measuring the temperature. The disclosed method is useful for reactions that occur at non-equilibrium conditions where any measured temperature would presume steady-state conditions.

12 Claims, 3 Drawing Sheets

(52) U.S. Cl.
CPC .................. *B01J 2219/00184* (2013.01); *B01J 2219/30207* (2013.01); *B01J 2219/30408* (2013.01); *B01J 2219/30416* (2013.01); *B01J 2219/30433* (2013.01); *B01J 2219/30466* (2013.01)

(56) References Cited

U.S. PATENT DOCUMENTS

| | | | |
|---|---|---|---|
| 2011/0113993 | A1 | 5/2011 | Esmaili et al. |
| 2013/0090953 | A1 | 4/2013 | Feria |
| 2014/0214457 | A1 | 7/2014 | Feria |
| 2016/0027122 | A1 | 1/2016 | Feria |
| 2016/0091203 | A1* | 3/2016 | Wang ............... F23N 1/022 700/274 |
| 2018/0347810 | A1 | 12/2018 | Chandran et al. |
| 2018/0362862 | A1* | 12/2018 | Gellaboina .......... G05B 13/042 |
| 2020/0219624 | A1 | 7/2020 | Feria |

OTHER PUBLICATIONS

ISA/US; International Search Report/Written Opinion dated Dec. 17, 21 in corresponding International application PCT/2021/051259 filed Sep. 21, 2021.

Feria, Erlan H.; Linger Thermo Theory: Simplifying the Finding of the Entropy of Mediums with Application that Span from Astrophysics to Human Life Span; 2016 IEEE International Conference on Smart Cloud (SmartCloud); Nov. 18-20, 2016; DOI: 10.1109/SmartCloud.2016.57.

Feria, Erlan H.; Matched processors for quantized control: A practical parallel-processing approach; Int. J. Control; 1985; pp. 695-713; vol. 42, No. 3.

Feria, Erlan H.; Novel Lingerdynamics Ectropies are Revealed as as Time Duals of Thermodynamics Entropies; IEEE International Conference on Systems, Man, and Cybernetics, Oct. 9-12, 2011; pp. 3378-3385.

Feria, Erlan H.; The Flexible Phase Entropy and its Rise from the Universal Cybernetics Duality; 2014 IEEE International Conference on Systems, Man, and Cybernetics Oct. 5-8, 2014; pp. 3221-3228.

Feria, Erlan H.; Power Centroid Radar and its Rise from the Universal Cybernetics Duality; Sensing Technologies + Applications; May 28, 2014; DOI:10.1117/12.2059153.

Feria, Erlan H.; Maximizing the efficiency and affordability of high-performance radar; SPIE; Jul. 7, 2014; 3 Pages; DOI:10.1117/2.1201407.005429.

* cited by examiner

METHOD FOR CONTROLLING TEMPERATURE OF A CHEMICAL REACTION

BACKGROUND OF THE INVENTION

The subject matter disclosed herein relates to temperature control systems and, more particularly, to temperature control systems for non-equilibrium conditions.

During many chemical and biological processes, proper control of temperature is an important factor. Conventionally, a given chemical reaction is optimized by trial and error. For example, the reaction may be performed many times at slightly different temperatures in order to determine the desired temperature that optimizes the yield of a particular chemical product. During a given reaction, the temperature of a system may be continually measured. When the measured temperature deviates from the desired temperature heat may be added or removed to compensate. While this solution may be adequate for many situations, it relies on the system in question being a steady state, equilibrium condition.

Some systems are non-equilibrium systems that deviate from the steady-state assumptions to such an extent that merely obtaining a measured temperature is not adequate. An improved method for controlling the temperature of a system is therefore desired. The discussion above is merely provided for general background information and is not intended to be used as an aid in determining the scope of the claimed subject matter.

SUMMARY

A method for controlling temperature of a chemical reaction is disclosed. Changes in mass of a chemical reaction are monitored and are used to calculate the temperature of the system. The reaction can be maintained at a desired temperature (T) without measuring the temperature. The disclosed method is useful for reactions that occur at non-equilibrium conditions where any measured temperature would presume steady-state conditions.

In a first embodiment, a method for controlling temperature without measuring the temperature is provided. The method comprising steps of: a) determining an initial system mass (M) of a chemical system which performs an endothermic chemical reaction between reactants in a solvent to produce products, wherein at least one of the products is an exiting product that is a gaseous product or a precipitation product, the chemical reaction having a desired temperature (T); b) adding the reactants and the solvent to a vessel, thereby initiating the chemical reaction; c) allowing the exiting product to exit the vessel; d) measuring a current system mass ($M_i$) for an $i^{th}$ iteration of the method: e) determining an exited mass ($E_i$) of the exiting product that exited during step c) based on the current system mass ($M_i$); f) calculating a change in reactant mass ($\Delta M_i'$) that occurred during the $i^{th}$ iteration based on the exited mass ($E_i$); g) calculating a calculated temperature ($T_i$) according to:

$$T_i = \alpha\left(\frac{M - \Delta M_i}{M}\right)T$$

wherein $\alpha$ is a positive number that is less than 2; h) adding additional reactants to the vessel in an amount equal to the exited mass ($E_i$); and i) adjusting a temperature of the chemical system to the desired temperature (T) by adding or removing heat based on a temperature change between the calculated temperature ($T_i$) and the desired temperature (T).

In a second embodiment, a method for controlling temperature without measuring the temperature is provided. The method comprising steps of: a) determining an initial system mass (M) of a chemical system which performs an endothermic chemical reaction between reactants in a solvent to produce products, wherein at least one of the products is an exiting product that is a gaseous product or a precipitation product, the chemical reaction having a desired temperature (T), wherein the chemical system further comprises an inert component that is a solid that is inert with respect to the chemical reaction; b) adding the reactants and the solvent to a vessel, thereby initiating the chemical reaction: c) allowing the exiting product to exit the vessel; d) measuring a current system mass ($M_i$) for an $i^{th}$ iteration of the method; e) determining an exited mass ($E_i$) of the exiting product that exited during step c); f) calculating a change in reactant mass ($\Delta M_i'$) that occurred during the $i^{th}$ iteration based on the exited mass ($E_i$); g) calculating a calculated temperature ($T_i$) according to:

$$T_i = \alpha\left(\frac{M - \Delta M_i}{M}\right)T$$

wherein $\alpha$ is a positive number that is less than 2; h) adding additional reactants to the vessel in an amount equal to the change in reactant mass $\Delta M_i'$; i) removing a portion of the inert component given by $R_i = \Delta M_i' - E_i$; and j) adjusting a temperature of the chemical system to the desired temperature (T) by adding or removing heat based on a temperature change between the calculated temperature ($T_i$) and the desired temperature (T).

In a third embodiment, a method for controlling temperature without measuring the temperature is provided. The method comprising steps of: a) determining an initial system mass (M) of a chemical system which performs an exothermic chemical reaction between reactants in a solvent to produce products, wherein at least one of the products is an exiting product that is a gaseous product or a precipitation product, the chemical reaction having a desired temperature (T); b) adding the reactants and the solvent to a vessel, thereby initiating the chemical reaction; c) allowing the exiting product to exit the vessel; d) measuring a current system mass ($M_i$) for an $i^{th}$ iteration of the method; e) determining an exited mass ($E_i$) of the exiting product that exited during step c) based on the current system mass ($M_i$); f) calculating a change in reactant mass ($\Delta M_i'$) that occurred during the $i^{th}$ iteration based on the exited mass ($E_i$); g) calculating a calculated temperature ($T_i$) according to:

$$T_i = 2T - \left(\alpha\left(\frac{M - \Delta M_i}{M}\right)T\right)$$

wherein $\alpha$ is a positive number that is less than 2; h) adding additional reactants to the vessel in an amount equal to the exited mass ($E_i$); and i) adjusting a temperature of the chemical system to the desired temperature (T) by adding or removing heat based on a temperature change between the calculated temperature ($T_i$) and the desired temperature (T).

In a fourth embodiment, a method for controlling temperature without measuring the temperature is provided. The method comprising steps of: a) determining an initial system mass (M) of a chemical system which performs an exothermic chemical reaction between reactants in a solvent to produce products, wherein at least one of the products is an exiting product that is a gaseous product or a precipitation product, the chemical reaction having a desired temperature (T), wherein the chemical system further comprises an inert component that is a solid that is inert with respect to the chemical reaction; b) adding the reactants and the solvent to a vessel, thereby initiating the chemical reaction; c) allowing the exiting product to exit the vessel; d) measuring a current system mass ($M_i$) for an $i^{th}$ iteration of the method; e) determining an exited mass ($E_i$) of the exiting product that exited during step c); f) calculating a change in reactant mass ($\Delta M_i'$) that occurred during the $i^{th}$ iteration based on the exited mass ($E_i$); g) calculating a calculated temperature ($T_i$) according to:

$$T_i = 2T - \left(\alpha\left(\frac{M - \Delta M_i}{M}\right)T\right)$$

wherein $\alpha$ is a positive number that is less than 2; h) adding additional reactants to the vessel in an amount equal to the change in reactant mass $\Delta M_i$; i) removing a portion of the inert component given by $R_i = \Delta M_i' - E_i$; and j) adjusting a temperature of the chemical system to the desired temperature (T) by adding or removing heat based on a temperature change between the calculated temperature ($T_i$) and the desired temperature (T).

This brief description of the invention is intended only to provide a brief overview of subject matter disclosed herein according to one or more illustrative embodiments and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

The disclosed system pertains to temperature control systems and specifically pertains to systems that control non-equilibrium systems whose mass changes over the course of a reaction. The disclosed method is used with chemical reactions wherein a product, such as a gaseous or solid product, exits the chemical reaction vessel over the course of the reaction.

Without wishing to be bound to any particular theory, a calculated temperature ($T_i$) of an endothermic system at non-equilibrium conditions during an $i^{th}$ iteration of the method can be calculated, rather than measured according to:

$$T_i = \alpha\left(\frac{M - \Delta M_i}{M}\right)T, \text{ Endothermic} \tag{1a}$$

wherein T is a desired temperature (i.e. a target temperature), M is an initial system mass of the entire chemical system within a vessel, $\Delta M_i$ is a change in reactant mass, and $\alpha$ is a positive number that is less than 2.

Likewise, a calculated temperature ($T_i$) of an exothermic system at non-equilibrium conditions during an $i^{th}$ iteration of the method can be calculated, rather than measured according to:

$$T_i = 2T - \left(\alpha\left(\frac{M - \Delta M_i}{M}\right)T\right), \text{ Exothermic} \tag{1b}$$

By calculating the $i^{th}$ iteration change in reactant mass ($\Delta M_i$), one can then find the calculated temperature ($T_i$) at non-equilibrium without using a thermocouple or other temperature measuring device, which would only give accurate temperature readings under equilibrium conditions. Based on the calculated temperature ($T_i$), a correct amount of heat can be added or removed to maintain the desired temperature (T).

Figure 1:
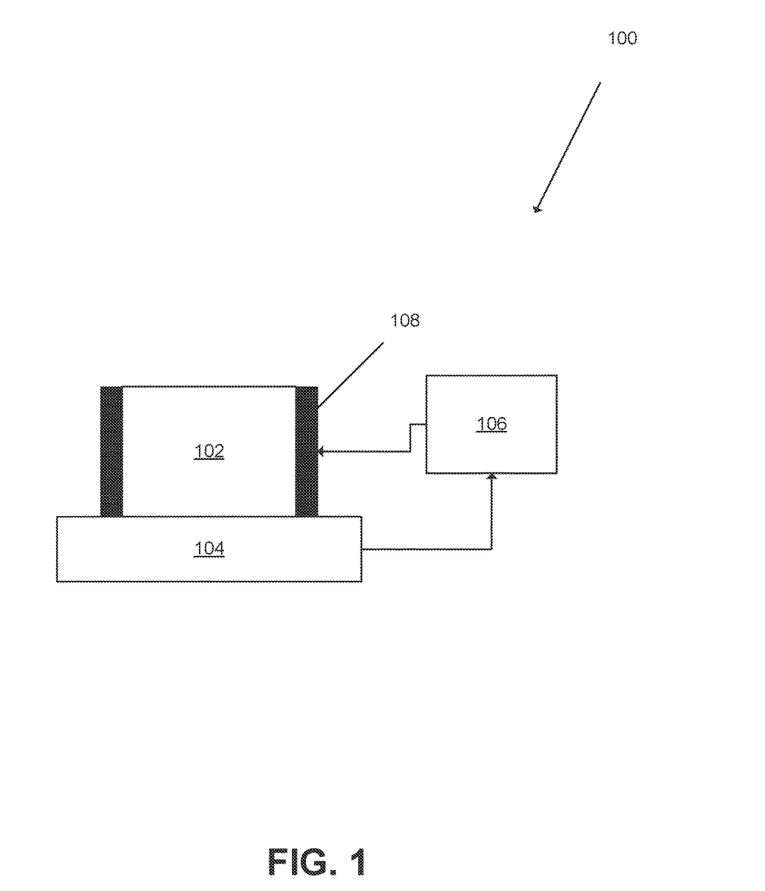
FIG. 1 is a schematic diagram of one system for implementing the disclosed method.

FIG. 1 depicts a system 100 comprising a chemical reaction vessel 102, a mass sensor 104 that provides the current system mass ($M_i$) to a computer 106. The computer 106 controls a heat adjustor 108 which is configured to selectively heat or cool the chemical reaction vessel 102. In one embodiment, the chemical reaction vessel 102 is thermally insulated using conventional insulating methods to minimize heat loss to the ambient environment. The mass sensor 104 may be, for example, a mass balance. The heat adjustor 108 may include conventional heating or cooling elements and the computer 106 selectively actuates the heat adjustor 108 to control the joules of heat that is added or removed.

Figure 2:
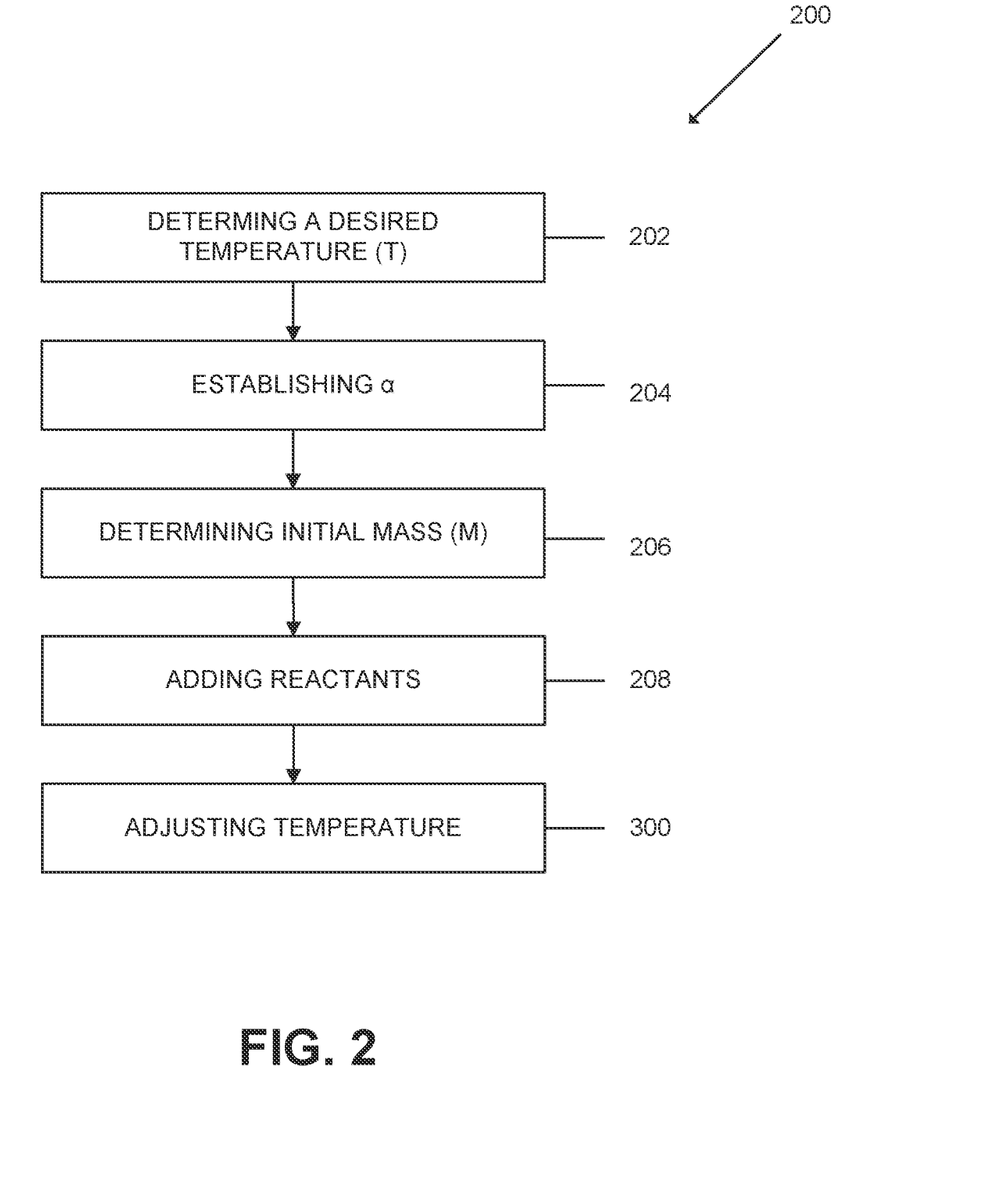
FIG. 2 is a flow diagram depicting one embodiment of the disclosed method.

Referring to FIG. 2, a method 200 is disclosed for controlling a temperature of a chemical reaction without measuring the temperature. The method 200 comprises step 202, wherein the desired temperature (T) is determined. For example, the desired temperature (T) may be experimentally determined by optimizing the yield of a particular chemical product by repeatedly conducting the chemical reaction at a variety of different temperatures. In the following hypothetical example, T=353K.

In step 204, a value for $\alpha$ is established. The value of a is determined as discussed elsewhere in this disclosure. If the reaction is endothermic then heat must be added to return the system to the desired temperature (T). The value for α is a positive, non-zero number that is less than 2. In one embodiment, the value of a is greater than or equal to 0.5 but less than 1.5. In another embodiment, the value of a is between 0.8 and 1.2. In the following hypothetical examples, α=1.

In step 206 of method 200, an initial system mass (M) of the chemical reactants, solvent and inert components is determined during the zero-ith iteration (i=0). The initial system mass (M) includes the reactants, solvent and inert components but does not include products. By way of illustration, and not limitation, a given chemical reaction may involve permitting predetermined quantities of reactants A and B to react in a solvent to form a desired product C and byproducts D and E. In this example byproduct D is a gaseous byproduct which exits the reaction vessel as it forms.

$$A+2B \rightarrow 2C+D(g)+E \tag{2}$$

For example, one may calculate that 1300 g of reactant A (molar mass 100.0 g mol$^{-1}$) will react with 910 g of reactant B (molar mass 35.0 g mol$^{-1}$) in the presence of 13,000 g of a solvent. The initial system mass (M) is therefor 15,210 g.

Figure 3:
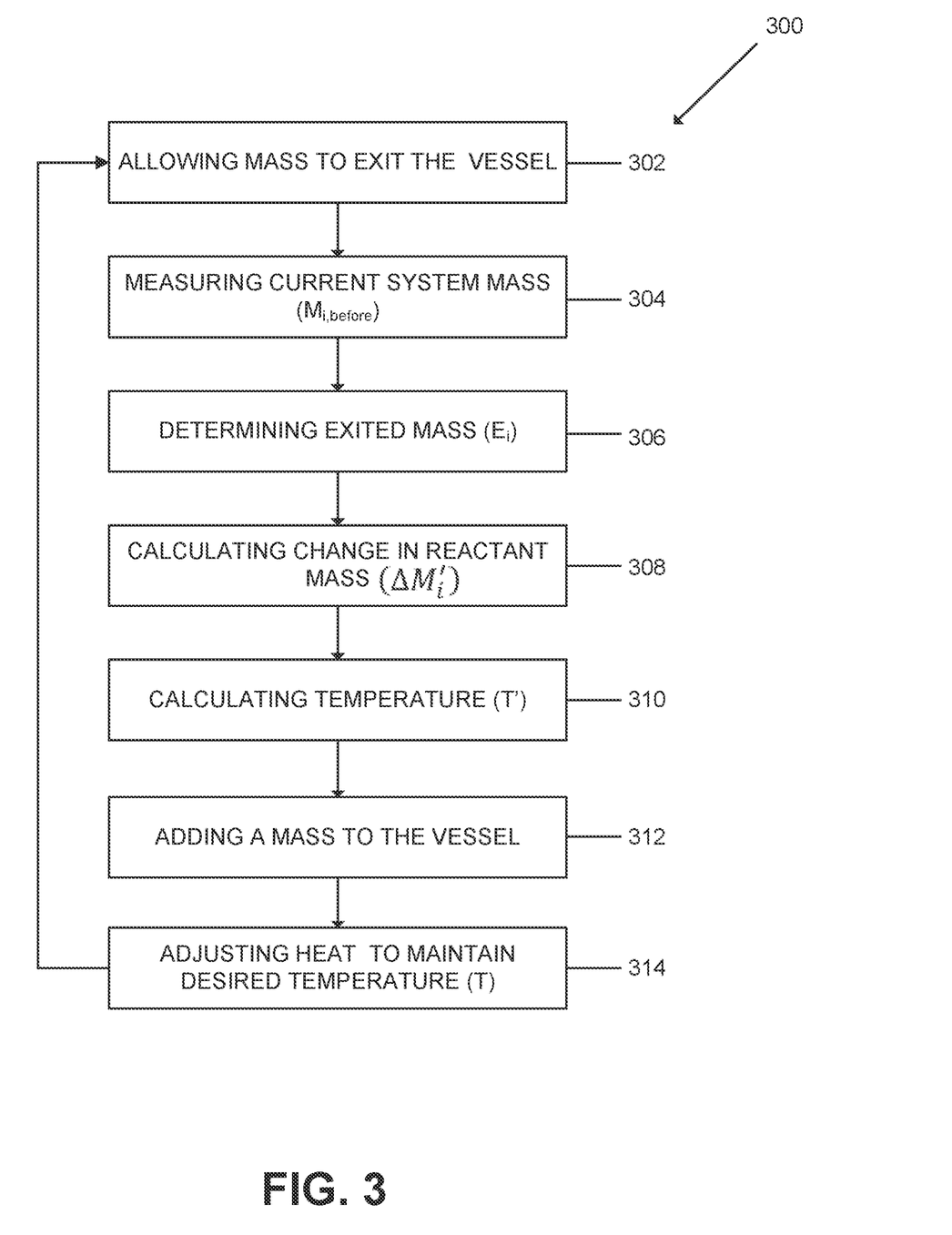
FIG. 3 is a flow diagram depicting one embodiment of a method for adjusting temperature.

In step 208, these reactants are added to a vessel, such as vessel 102, which initiates the chemical reaction. The disclosed method 300 then adjusts the temperature of the system based on the amount of product D that exits the vessel.

Endothermic Example

Referring to FIG. 3, the disclosed method 300 is used for chemical reactions wherein α change in mass occurs due to at least one of the products leaving the vessel. For example, a gaseous product may be allowed to exit the vessel as it is formed. Alternatively, a solid precipitate may be removed by filtration or other suitable method. In the example that follows, an endothermic reaction is used.

In step 302, a quantity (i.e. some or all) of one product is allowed to exit the chemical reaction vessel during the course of the chemical reaction. The exiting of this $i^{th}$ iteration product permits one to calculate the $i^{th}$ iteration change in reactant mass ($\Delta M_i$) that gave rise to this exited mass ($E_i$).

In step 304, the current system mass ($M_i$) of the $i^{th}$ iteration is measured with the mass sensor 104. The current system mass ($M_i$) includes the entire contents of the vessel such as reactants, solvent, inert components and any products that have not exited the vessel. Because the current system mass ($M_i$) is measured before the mass of the vessel is adjusted to match the initial system mass (M) (step 312) it may be referred to as $M_{i,before}$.

In step 306, the exited mass ($E_i$) that exited the vessel during the $i^{th}$ iteration is determined by comparing the current system mass ($M_i$) at the $i^{th}$ iteration to the initial system mass (M). In the current example, this corresponds to the mass of product D that has exited the vessel. For example, if the initial system mass (M) was 15,210 g, and the first iteration (i=1) system mass ($M_{1,before}$) is 15,070 (as measured before the addition of any mass), then the exited mass ($E_1$) is found to be 140 g.

$$E_i = M - M_{i,before} \tag{3a}$$

$$E_1 = M - M_{1,before} \tag{3b}$$

$$E_1 = 15{,}210 \text{ g} - 15{,}070 \text{ g} = 140 \text{ g} \tag{3c}$$

In step 308, the change in reactant mass ($\Delta M_i$) is calculated for the $i^{th}$ iteration based on the exited mass ($E_i$). For example, given $E_1$=1409, the stoichiometry of the reaction (see equation 2) permits one to calculate that 400 g of reactant A and 280 g of reactant B was consumed:

$$\Delta M_A = \tag{4a}$$

$$\frac{140 \text{ g } D}{1} \frac{\text{mole } D}{35 \text{ g } D} \frac{1 \text{ mole } A}{1 \text{ mole } D} \frac{100.0 \text{ g } A}{\text{mole } A} = 400 \text{ g of reactant } A \text{ consumed}$$

$$\Delta M_B = \tag{4b}$$

$$\frac{140 \text{ g } D}{1} \frac{\text{mole } D}{35 \text{ g } D} \frac{2 \text{ mole } B}{1 \text{ mole } D} \frac{35.0 \text{ g } B}{\text{mole } B} = 280 \text{ g of reactant } B \text{ consumed}$$

The change in reactant mass ($\Delta M_i$) at the $i^{th}$ iteration, where i=1, is therefore:

$$\Delta M_i = \Delta M_{reactants} = \Delta M_A + \Delta M_B \tag{5a}$$

$$\Delta M_1 = 400 \text{ g} + 280 \text{ g} = 680 \text{ g reactants consumed} \tag{5b}$$

In step 310 the calculated temperature ($T_i$) is then found according to:

$$T_i = \alpha \left( \frac{M - \Delta M_i}{M} \right) T, \text{ Endothermic} \tag{6a}$$

$$T_1 = \left( \frac{15{,}210 - 680}{15{,}210} \right) 353 \, K = 337.22 \, K \tag{6b}$$

In step 312, additional mass in the form of additional reactants is added to the reaction vessel. In one embodiment, the mass of reactants that is added is equal to the exited mass ($E_i$). For example, 140 g of reactants may be added to restore the system to the initial system mass (M). Given the stoichiometry of equation 2, this corresponds to 52.36 g of reactant A and 57.64 g of reactant B found by examining the molar mass ratio of reactants A:B.

$$\frac{\text{molar mass of } A \times \text{molar ratio}}{\text{molar mass of } B \times \text{molar ratio}} = \frac{100.0 \times 1}{35.0 \times 2} = \frac{1.429}{1.00} \tag{7}$$

In another embodiment, the mass that is added is equal to the change in reactant mass ($\Delta M_i$). In the current example, 680 g of reactants (specifically 400 g of reactant A and 280 g of reactant B) is added to the vessel. As is discussed in detail elsewhere in this disclosure, excess mass in the form of inert components is removed to maintain the initial system mass (M).

In one embodiment, the step of adding the mass simultaneously adjusts the temperature of the system by adding a temperature-adjusted mass of reactants (i.e. step 312 and step 314 are accomplished simultaneously). In one embodiment, the mass that is added has its temperature pre-adjusted to be less than the calculated temperature ($T_i$) such that heat is removed from the vessel. In another embodiment, the mass that is added has its temperature pre-adjusted to be greater than the calculated temperature ($T_i$) such that heat is added to the vessel.

Iterations when Added Mass is ($E_i$)

In those embodiments, where the added mass is equal to the exited mass ($E_i$), the updated system mass is:

$$M_{i,after} = M - E_i + E_i \tag{8a}$$

$$M_{1,after} = 15{,}210 \text{ g} - 140 \text{ g} + 140 \text{ g} = 15{,}210 \text{ g} \tag{8b}$$

In these embodiments, due to the cancelation of the $-E_i$ and $+E_i$, the current system mass ($M_i$) is maintained at the initial system mass (M).

Iterations when Added Mass is $\Delta M_i$

In another embodiment where the added mass is equal to the change in reactant mass ($\Delta M_i$), additional steps can be performed to maintain a constant system mass while maintaining a continuous method. For example, in step 206 in the initial system mass (M) may include inert components such as a solid which is easily separated from the system by filtration. For example, one may calculate that 1300 g of reactant A will react with 910 g of reactant B in the presence of 11,245 g of a solvent and 1,755 g of an inert component. The initial system mass (M) is therefore 15,210 g. The 1,755 g of the inert component provides a mass overhead that can be used to adjust the system mass during each iteration.

The composition of the chemically inert component depends on the nature of the reaction but can include substances such as polymeric beads, glass beads, silica or alumina, stainless steel beads, etc. The size of the solid may be selected such that it can be easily separated from any precipitation product that is formed during the reaction. These inert components provide a removed inert mass ($R_i$) that can be removed to maintain a constant system mass where in:

$$R_i = \Delta M_i - E_i \tag{9a}$$

With reference to the previous examples, if 140 g of exited mass left the vessel as a result of 680 g of reactants being consumed, then 540 g of inert components would be removed to maintain a constant system mass while 680 g of additional reactants are added.

$$R_1 = 680\ g - 140\ g = 540\ g \text{ of inert components to be removed} \tag{9b}$$

In such embodiments, the updated system mass would therefore be given by:

$$M_{1,after} = M - (E_i + R_i) + \Delta M_i \tag{10a}$$

$$M_{1,after} = 15{,}210\ g - (140\ g + 540\ g) + 680\ g = 15{,}210\ g \tag{10b}$$

In step 314, heat is adjusted to restore the system to the desired temperature (T). For example, if the solvent is water, one can use the specific heat of water (4.184 J g$^{-1}$K$^{-1}$) to obtain an estimate for the amount of heat (in J) that is used to warm the vessel by 15.78 K such that the desired temperature (T) of 353 K is achieved. For example, in an embodiment where the added mass equal to the exited mass ($E_i$) (e.g. 140 g) such that the system mass is a constant 15,210 g, the kJ of heat to be added is given by:

$$\frac{4.184\ J}{g\ K} \frac{15.78\ K}{1} \frac{15{,}210\ g}{1} \frac{1\ kJ}{1000\ J} = 1{,}004\ kJ \tag{11}$$

In other embodiments, a non-water solvent is used with a corresponding specific heat. For an exothermic reaction, the heat adjustor 108 may be used to remove the correct amount of heat to cool the vessel.

Subsequent Iterations

Method 300 may be continued by returning to step 302 and performing a fresh iteration (i=2) of the method. At the beginning of the second iteration of method 300, one finds the current system mass ($M_2$), whose value is equal to ($M_{i,after}$), is the same as the initial system mass (M). For example, in the previous hypothetical example, the current system mass ($M_2$) and the initial system mass (M) are both equal to 15,210 g.

In step 302, a quantity of one product is allowed to exit the chemical reaction vessel.

In step 304, the $2^{nd}$ iteration current system mass ($A_2$), whose value is denoted as $M_{2,before}$, is measured with the mass sensor 104 before step 312 is executed. In this hypothetical example, the current system mass ($M_{2,before}$) value is measured and found to be 15,140 g.

In step 306, for the hypothetical example, the exited mass ($E_2$) that exited the vessel is determined to be 70 g:

$$E_i = M - M_{i,before} \tag{12a}$$

$$E_2 = M - M_{2,before} \tag{12b}$$

$$E_2 = 15{,}210\ g - 15{,}140\ g = 70\ g \tag{12c}$$

In step 308, the change in reactant mass ($\Delta M_2$) for the second iteration is calculated based on the exited mass ($E_2$). For example, given $E_2$=70 g, the stoichiometry of the reaction permits one to calculate that 200 g of reactant A and 140 g of reactant B was consumed:

$$\Delta M_A = \tag{13a}$$

$$\frac{70\ g\ D}{1} \frac{\text{mole}\ D}{35\ g\ D} \frac{1\ \text{mole}\ A}{1\ \text{mole}\ D} \frac{100.0\ g\ A}{\text{mole}\ A} = 200\ g \text{ of reactant } A \text{ consumed}$$

$$\Delta M_B = \tag{13b}$$

$$\frac{70\ g\ D}{1} \frac{\text{mole}\ D}{35\ g\ D} \frac{2\ \text{mole}\ B}{1\ \text{mole}\ D} \frac{35.0\ g\ B}{\text{mole}\ B} = 140\ g \text{ of reactant } B \text{ consumed}$$

The change in reactant mass ($\Delta M_2$) is therefore.

$$\Delta M_2 = \Delta M_{reactants} = \Delta M_A + \Delta M_B \tag{14a}$$

$$\Delta M_2 = 200\ g + 140\ g = 340\ g \text{ reactants consumed} \tag{14b}$$

In step 310 the second iteration calculated temperature ($T_2$) is found according to:

$$T_i = \alpha\left(\frac{M - \Delta M_i}{M}\right)T, \text{ Endothermic} \tag{15a}$$

$$T_2 = 1 \times \left(\frac{15{,}210 - 340}{15{,}210}\right) 353\ K = 345.31\ K \tag{15b}$$

In step 312, in one embodiment, additional mass in the form of additional reactants (equal to the exited mass ($E_i$)) is added. In the second iteration for the example under consideration (which has the exited mass $E_2$=70 g), 70 g of reactants (specifically 41.18 g of reactant A and 28.82 g of reactant B) is added to the vessel. Because the change in reactant mass ($\Delta M_i$) is always greater than the exited mass ($E_i$) (whose mass is added back to the vessel in the form of reactants), this embodiment is a semi-batch process because the number of possible iterations has an upper limit due the continuous use of reactants whose masses are only partially replaced.

In step 312, in another embodiment, additional mass in the form of additional reactants (equal to the change in reactant mass ($\Delta M_i$)) is added. In the current example, 340 g of reactants (specifically 200 g of reactant A and 140 g of reactant B) is added to the vessel. Because the additional mass of reactants is equal to the mass of reactants that is consumed, such a method is a continuous method. Because the amount of additional mass is greater than the amount of the exited mass, inert components are removed from the vessel to maintain a constant system mass, as discussed in detail elsewhere in this disclosure.

In step 314, heat is adjusted to restore the system to the desired temperature (T). In the present second iteration example, an amount of heat is added to increase the temperature by 7.79 K (from 345.31 K to 353 K). For a water-based system:

$$\frac{4.184\, J}{g\, K} \frac{7.79\, K}{1} \frac{15{,}210\, g}{1} \frac{1\, kJ}{1000\, J} = 495.29\, kJ \tag{16}$$

Exothermic Example

While the preceding discussion was directed toward endothermic examples, a similar method is equally applicable with regard to exothermic reactions. In the following hypothetical example, $\alpha$ is also one. For two iterations (i=1 and i=2) hypothetical example, where: a) M=15,210 g; b) T=353K; c) $\alpha$=1; d) $E_1$=140 g giving rise to $\Delta M_1$=680 g; and e) $\Delta M_2$=340 g giving rise to $E_2$=70 g one derives:

$$T_i = 2T - \alpha\left(\frac{M - \Delta M_i}{M}\right)T,\ \text{Exothermic} \tag{17a}$$

$$T_1 = 2 \times 353 - 1 \times \left(\frac{15{,}210 - 680}{15{,}210}\right) 353\, K = 368.78\, K \tag{17b}$$

$$T_2 = 2 \times 353 - 1 \times \left(\frac{15{,}210 - 340}{15{,}210}\right) 353\, K = 360.69\, K \tag{17c}$$

which is consistent with an exothermic reaction that has been restored to the desired temperature (T) between iterations. Heat may be removed by actuating heat adjustor 108 to cool the vessel.

Establishing $\alpha$

A statistical value for $\alpha$ can be readily found. For instance, it can be found for a hypothetical chemical reaction, such as equation 2 where a gas D(g) is being continuously released, using the following method.

$$\alpha = \sum_{i=1}^{N} \alpha_i / N \tag{18}$$

$$\alpha_i = \left(\frac{M}{T}\right) \Big/ \left(\frac{M - \Delta M_i}{T - |\Delta T_i|}\right) \tag{19}$$

where equation 18 denotes the averaging of N repeated reactions of the chemical reaction. These reactions yield N possible realizations for $\alpha$ specified as $\{\alpha_i: i=1, \ldots, N\}$ where $\alpha_i$ is found at each measuring time using equation 19 where: a) M is the initial system mass and T is the desired temperature: b) $\Delta M_i$ is the change in reactant mass during the time interval $\Delta \tau_i$ that starts at the beginning of the chemical reaction; and c) $|\Delta T_i|$ is the magnitude of the temperature change experienced during the time interval $\Delta \tau_i$.

A set of suitable reactant time intervals $\{\Delta \tau_i: i=1, \ldots, N\}$ is selected to conduct the N independent experiments. The i-th experiment yields a value for $\Delta M_i$ that can be experimentally determined using a mass sensor that measures the mass of the gas product D that exists the vessel during the time interval $\Delta \tau_i$. The magnitude of the temperature change of the vessel during the time interval $\Delta \tau_i$ is measured using, for instance, a thermocouple. The reactions are performed under conditions where the vessel is highly thermally insulated to obtain the best results.

Tables 1 and 2 present values and physical characteristics pertaining to a hypothetical chemical reaction example. This example examines the results derived for the generic chemical reaction given by equation 2 where the statistical value for $\alpha$ is found to be close to one. The hypothetical example considers the case where: a) the solvent mass has the constant value of 13,000 g; b) the initial mass for the reactant A is 1,300 g; c) the initial mass of the reactant B is 910 g; d) the initial system mass M in the vessel is 15,210 g; e) the desired temperature T in the vessel is 353 K. These values are tabulated in Table 1. At four different times (1 min, 4 mins, 7 mins, 8 mins, see Table 2 where they are tabulated) a mass balance is used to measure the mass of the exited gas product D, seen in Table 2 to be given by (17 g, 70 g, 123 g, 140 g). The stoichiometry of the reaction then permits one to find the total mass of the reactants A plus B (85 g, 340 g, 595 g, 680 g) that are responsible for the mass of the exited gas product D (17 g, 70 g, 123 g, 140 g). During each of these times a measurement is made (for instance, using a thermocouple) of the temperature at each measuring time to determine its change (1.9 K, 8.0 K, 13.8 K, 16.0 K) from the desired temperature T, the value of the temperature $T_i$ at the end of each time interval $\Delta \tau_i$ is less than T for an endothermic reaction and greater than T for an exothermic reaction. Equation 19 is then used to evaluate the value of $\alpha$ at each different measuring time (1.00021, 0.99968, 1.00003, 0.99935), whose average value according to equation 18 is then found to be approximately equal to one, i.e., $\alpha \approx 1$.

TABLE 1

| Solvent Constant Mass (g) | Reactant A Initial Mass (g) | Reactant B Initial Mass (g) | Vessel's M Initial Mass (g) | Vessel's T Initial Temp. (K) |
| --- | --- | --- | --- | --- |
| 13,000 | 1,300 | 910 | 15,210 | 353 |

TABLE 2

| Time Interval $\Delta \tau_i$ (min) | Exiting Gas $\Delta D_i$ (g) | Spent A Reactant $\Delta A_i$ (g) | Spent B Reactant $\Delta B_i$ (g) | Spent A Plus B $\Delta M_i$ (g) | Thermal Change $\lvert \Delta T_i \rvert$ (K) | $\alpha_i = \left(\frac{M}{T}\right) \Big/ \left(\frac{M - \Delta M_i}{T - \lvert \Delta T_i \rvert}\right)$ Value |
| --- | --- | --- | --- | --- | --- | --- |
| 1 | 17  | 50  | 35  | 85  | 1.9  | 1.00021 |
| 4 | 70  | 200 | 140 | 340 | 8.0  | 0.99968 |
| 7 | 123 | 350 | 245 | 595 | 13.8 | 1.00003 |
| 8 | 140 | 400 | 280 | 680 | 16.0 | 0.99935 |

$\alpha = \sum_{i=1}^{4} \alpha_i / 4 \approx 1$

Theoretical Background

Linger-thermo theory (LTT) is a 'dynamic' byproduct of a past-uncertainty/future-certainty time-complementary duality principle of physics, abbreviated as POP, that first surfaced in stochastic optimum control in 1960 and has been used in the past via another byproduct of the POP, named latency-information theory (LIT) which is 'stationary' in this case, to generate radar designs that yield maximally efficient and affordable high-performance solutions (see U.S. Pat. No. 10,101,445). The dynamic LTT has already been used to find efficient solutions to biophysics' lifespan studies and astrophysics' dark-matter studies that make use of thermotes, which are degrees of freedom (DoF) based thermal-energy quantums that fuel the kinetic-energy of gyradors, which are statistical dissimilar cells (SDC) based gyrating-mass quantums. Thermotes first naturally surfaced in LTT in 2014 from the derivation of the entropy of flexible-phase mediums for use in lifespan studies. They simplify entropy finding and their thermal energy is $e_{Th}=N_{DoF}k_BT/2$ where $k_B$ is the Boltzmann constant, T is the medium's temperature and $N_{DoF}$ is the number of degrees of freedom for the motion of a particle, e.g., 3 for the photons in a photon-gas (PG) and 2 for particles moving in the event horizon of a black-hole (BH). For the BH and PG their entropy is $k_B/2$ times the ratio of their mass-energy over the thermote energy. Moreover, the eV mass of the BH and PG thermotes at the cosmic microwave background (CMB) temperature of 2.725 Kelvin has been found to be 235.14 µeV and 352.71 µeV, respectively, values which fall within the 50 to 1,500 µeV range for the axion, a top dark matter candidate. In LTT the shape of the medium of mass M and volume V is modeled as a sphere of radius r where at its center the point-mass M is assumed to reside. In this LTT model there are $M/m_G$ gyrador particles ($m_G$ is the mass of a gyrador particle) in the medium whose total kinetic energy matches the medium's gravitational potential energy $GM^2/2r$, which is done to prevent the gravitational collapse of the medium via the gyrating motion of the gyradors. Finally, in LTT the kinetic energy $m_Gv^2/2$ of the gyrador is set equal to the thermote energy $e_{Th}$, which fuels it and then yields $m_G=2e_{th}/v^2=2re_{th}/GM$ where the gyrador's speed $v=(GM/r)^{1/2}$ denotes the orbiting speed of the gyrador about the point-mass M at the radial distance r, and G is the gravitational constant. The me equation is thus found to express the gyrador's mass mc as a linear function of the thermote energy $e_{Th}$, which is, in turn, a linear function of the medium's temperature T. In this way the temperature of the medium T is found to be related to gravitation via the gyrador's mass $m_G$, where in LTT the motion of these statistical gyradors act to avoid gravitational collapse.

The disclosed method brings maximum efficiency and affordability to industrial processes where dissimilar cells (e.g. discrete chemical species, discrete biological cells, etc.) are created and exit the system or die while physically and chemically interacting to achieve desirable outputs. Such "first principles" derived method to industrial processes design is non-existent because the physical principles associated with them were not sufficiently known. This is no longer the case with the emerging time-complementary duality principle of physics or POP that has inherently given rise to the disclosed temperature modeled average mass of dissimilar cells equation!

This disclosure provides a straightforward relationship that has been discovered to exist between the modeled average mass of dissimilar cells in any medium and the temperature of the medium. This equation permits one to efficiently and affordably regulate the operation of the medium where the dissimilar cells are created, die and experience both physical and chemical interactions to produce desirable outputs.

An expression for the average mass of the dissimilar cells of the medium, i.e., the gyrador mass $m_G$, will be given first. This gyrador mass expression, which arises naturally from the application of the time-complementary duality principle of physics or POP, allows one to find the gyrador mass with only knowledge about the given medium's temperature, mass, volume, and the degrees of freedom of its fundamental particles or molecules.

A gyrador's mass $m_G$ (a statistical particle that naturally surfaces in the POP-guided LTT) denotes the modeled average mass of the dissimilar cells that make up the medium. Its steady-state value is given by the expression:

$$m_G = \frac{N_{DoF}k_BTr}{GM} = \frac{M}{N_{Cells}} \qquad (20)$$

where: a) M is the medium's total mass; b) r is the radius of the medium's volume V=M/ρ, where ρ is the medium's density, assumed spherical in shape; c) G is the gravitational constant; d) T is the operating temperature of the medium; e) $k_B$ is the Boltzmann constant; f) $N_{DoF}$ is the number of degrees of freedom for the medium particles (for instance, $N_{DoF}$ is 5 for a liquid water based medium at 310 Kelvin) and (g) $N_{Cells}$ is the number of discrete cells in the system. The reaction vessel need not be spherical to determine its spherical volume. For example, the volume of a cylinder can be calculated and then the radius (r) of a corresponding sphere with the same volume may be used. This radius is the spherical radius of the cylinder.

After a certain period of time, a new temperature T' will arise in the medium that is triggered by reactants in M that act during the considered period of time and is assumed to exit the medium. The subtraction of the mass of these reactants given by ΔM' from M will give rise to a different dynamic gyrador mass $m_G$' for the medium given by the following expression:

$$m'_G = \frac{k_BT'N_{DoF}r}{GM'} = \frac{M'}{N'_{Cells}} \qquad (21)$$

where: a) the mass M' is given according to:

$$M'=M-\Delta M' \qquad (22)$$

b) T' will be less than T for an endothermic chemical reaction and greater than T for an exothermic one; and c) $N_{Cells}$' denotes the number of discrete cells from which M' is formed.

For the endothermic chemical reaction case T' will be given by the following expression $$T'=T+\Delta T'=T-|\Delta T'|, \text{endothermic} \qquad (23)$$

where |ΔT'| denotes the magnitude of the difference between T' and T, given by ΔT'=T'−T, with T' being less than T in value.

The steady-state gyrador-gravity equation 20 and the dynamic gyrador-gravity equation 21 may be combined to yield:

$$N'_{Cells} = \frac{(M'/M)N_{Cells}}{\alpha}, \text{endothermic} \qquad (24a)$$

$$\alpha = \left(\frac{M}{T}\right) / \left(\frac{M'}{T'}\right) = \left(\frac{M}{T}\right) / \left(\frac{M - \Delta M'}{T - |\Delta T'|}\right), \text{ endothermic} \quad (24b)$$

The value of α is the ratio of the steady-state mass/temperature (M/T) over the dynamic mass/temperature $$\left(\frac{M - \Delta M'}{T - |\Delta T'|}\right)$$

of the chemical system, ratios that are not expected to largely deviate from each other.

Combining equations 20, 21, 24a and 24b at constant $N_{DoF}$, $k_B$, G, and r and solving for T' one derives:

$$T' = \frac{(M'/M)^2 T}{(N'_{Cells}/N_{Cells})} = \alpha\left(\frac{M'}{M}\right)T, \text{ endothermic} \quad (25a)$$

$$\text{wherein } \alpha = \left(\frac{N_{Cells}}{N'_{Cells}}\right)\left(\frac{M'}{M}\right), \text{ endothermic} \quad (25b)$$

The utility of the disclosed equations 25a and 25b is that this expression can be used in most industrial processes, if not all, to optimally regulate the temperature of an industrial process where reactions occur at non-equilibrium conditions. This is achieved through the statistical finding of a constant value for the parameter a which relates T' to T according to T'=a (M'/M)T. For any given mass ratio M'/M the value of α will then be ruled by the distribution of dissimilar cells of the medium which, in turn, give rise to the number of cells ratio $N_{Cells}/N'_{Cells}$ which directly impacts the value of α according to the expression $\alpha = (N_{Cells}/N'_{Cells})(M'/M)$.

For the exothermic chemical reaction case the new temperature T' will be greater than T. For a reactant mass use given by ΔM', the increase in the temperature in the vessel can be assumed to be the same as the decrease that occurs for the endothermic reaction. Under this assumption the new increased value for the temperature for the medium can be found from the following expression:

$$T' = T + \left(T - \alpha\left(\frac{M'}{M}\right)T\right) = 2T - \alpha\left(\frac{M'}{M}\right)T, \text{ Exothermic} \quad (26)$$

where the amount of increase |ΔT'| of the temperature T given by $$|\Delta T'| = \left(T - \alpha\left(\frac{M'}{M}\right)T\right)$$

in equation 26 is in magnitude the same amount that T would decrease inside the vessel if the chemical reaction was endothermic rather than exothermic. This $$\left(T - \alpha\left(\frac{M'}{M}\right)T\right)$$

amount, which is positive in value since T is greater than $$\alpha\left(\frac{M'}{M}\right)T,$$

is then added to T to yield the temperature T' inside the vessel which gives a higher than T exothermic temperature.

Moreover, it is noted that when the exothermic temperature $$T' = 2T - \alpha\left(\frac{M'}{M}\right)T = T + |\Delta T'|$$

replaces the endothermic temperature $$T' = \alpha\left(\frac{M}{M}\right)T = T - |\Delta T'|$$

in the endothermic gyrador mass equation 21 the following exothermic gyrador mass expression results $$m'_{G,exo} = \quad (27a)$$

$$\frac{k_B(T + |\Delta T'|)N_{DoF}r}{GM'} = \frac{M'}{N'_{Cells,exo}} = \frac{T + |\Delta T'|}{T - |\Delta T'|}m'_G = \frac{T + |\Delta T'|}{T - |\Delta T'|}\frac{M'}{N'_{Cells,}}$$

wherein $$N'_{Cells,exo} = \frac{T - |\Delta T'|}{T + |\Delta T'|}N'_{Cells,} \quad (27b)$$

where: a) $m_{G,exo}'$ is the mass of exothermic gyradors, a mass that is greater than or equal to the mass of the endothermic gyradors $m_G'$; and b) $N_{Cells,exo}'$ is the number of exothermic dissimilar cells, a number that is smaller than or equal to the number of endothermic dissimilar cells $N_{Cells}'$.

The utility of the disclosed POP derived equations is that they offer efficient models for the regulation of processes where dissimilar cells are created, die or otherwise exit the system and experience both physical and chemical interactions that produce desirable outputs. These POP derived equations could be used in at least five different modes. These are: 1) to suitably model the distribution of the dissimilar cells to satisfy a required temperature range; 2) to model the temperature of the process such that it conforms with the temperature modeled average mass of the specified mixture of dissimilar cells; 3) to model the volume of the mixture to achieve a desirable outcome; 4) to model the mass of the medium to achieve a desirable outcome; and 5) regulation schemes that combine 2 or more of the previous models. Moreover, the temperature modeled average mass of dissimilar cells equation should find applications in the modeling and investigation of life's evolutionary stages and processes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling temperature without measuring the temperature, the method comprising steps of:
   a) determining an initial system mass (M) of a chemical system which performs an endothermic chemical reaction between reactants in a solvent to produce products, wherein at least one of the products is an exiting product that is a gaseous product or a precipitation product, the chemical reaction having a desired temperature (T);
   b) adding the reactants and the solvent to a vessel, thereby initiating the chemical reaction;
   c) allowing the exiting product to exit the vessel;
   d) measuring a current system mass ($M_i$);
   e) determining an exited mass ($E_i$) of the exiting product that exited during step c) based on the current system mass ($M_i$);
   f) calculating a change in reactant mass ($\Delta M_i'$) that occurred based on the exited mass ($E_i$);
   g) calculating a calculated temperature ($T_i$) according to:

$$T_i = \alpha\left(\frac{M - \Delta M_i}{M}\right)T$$

wherein $\alpha$ is a positive number that is less than 2;
   h) adding additional reactants to the vessel in an amount equal to the exited mass ($E_i$);
   i) adjusting a temperature of the chemical system to the desired temperature (T) by adding or removing heat based on a temperature change between the calculated temperature ($T_i$) and the desired temperature (T); and
   j) iteratively repeating steps c) to i).

2. The method as recited in claim 1, the repeating occurring at a predetermined interval.

3. The method as recited in claim 2, wherein the predetermined interval is at least one repeat every five minutes.

4. The method as recited in claim 1, the repeating occurring continually in real-time.

5. The method as recited in claim 1, wherein the step e) and d) are repeated the repeating occurring until the current system mass ($M_i$) is below a threshold and then step e) is performed.

6. The method as recited in claim 1, wherein $\alpha$ is between 0.5 and 2.

7. The method as recited in claim 1, wherein $\alpha$ is between 0.8 and 1.5.

8. The method as recited in claim 1, wherein $\alpha$ is between 0.8 and 1.2.

9. A method for controlling temperature without measuring the temperature, the method comprising steps of:
   a) determining an initial system mass (M) of a chemical system which performs an endothermic chemical reaction between reactants in a solvent to produce products, wherein at least one of the products is an exiting product that is a gaseous product or a precipitation product, the chemical reaction having a desired temperature (T), wherein the chemical system further comprises an inert component that is a solid that is inert with respect to the chemical reaction;
   b) adding the reactants and the solvent to a vessel, thereby initiating the chemical reaction;
   c) allowing the exiting product to exit the vessel;
   d) measuring a current system mass ($M_i$);
   e) determining an exited mass ($E_i$) of the exiting product that exited during step c);
   f) calculating a change in reactant mass ($\Delta M_i'$) that occurred based on the exited mass ($E_i$);
   g) calculating a calculated temperature ($T_i$) according to:

$$T_i = \alpha\left(\frac{M - \Delta M_i}{M}\right)T$$

wherein $\alpha$ is a positive number that is less than 2;
   h) adding additional reactants to the vessel in an amount equal to the change in reactant mass $\Delta M_i'$;
   i) removing a portion of the inert component given by $R_i = \Delta M_i' - E_i$;
   j) adjusting a temperature of the chemical system to the desired temperature (T) by adding or removing heat based on a temperature change between the calculated temperature ($T_i$) and the desired temperature (T); and
   k) iteratively repeating steps c) to i).

10. The method as recited in claim 9, wherein the inert component is selected from a group consisting of polymeric beads, glass beads, silica, alumina and stainless-steel beads.

11. A method for controlling temperature without measuring the temperature, the method comprising steps of:
   a) determining an initial system mass (M) of a chemical system which performs an exothermic chemical reaction between reactants in a solvent to produce products, wherein at least one of the products is an exiting product that is a gaseous product or a precipitation product, the chemical reaction having a desired temperature (T);
   b) adding the reactants and the solvent to a vessel, thereby initiating the chemical reaction;
   c) allowing the exiting product to exit the vessel;
   d) measuring a current system mass ($M_i$);
   e) determining an exited mass ($E_i$) of the exiting product that exited during step c) based on the current system mass ($M_i$);
   f) calculating a change in reactant mass ($\Delta M_i'$) that occurred based on the exited mass ($E_i$);
   g) calculating a calculated temperature ($T_i$) according to:

$$T_i = 2T - \left(\alpha\left(\frac{M - \Delta M_i}{M}\right)T\right)$$

wherein $\alpha$ is a positive number that is less than 2;
   h) adding additional reactants to the vessel in an amount equal to the exited mass ($E_i$);
   i) adjusting a temperature of the chemical system to the desired temperature (T) by adding or removing heat based on a temperature change between the calculated temperature ($T_i$) and the desired temperature (T); and
   j) iteratively repeating steps c) to i).

12. A method for controlling temperature without measuring the temperature, the method comprising steps of:
   a) determining an initial system mass (M) of a chemical system which performs an exothermic chemical reaction between reactants in a solvent to produce products, wherein at least one of the products is an exiting product that is a gaseous product or a precipitation product, the chemical reaction having a desired temperature (T), wherein the chemical system further comprises an inert component that is a solid that is inert with respect to the chemical reaction;
b) adding the reactants and the solvent to a vessel, thereby initiating the chemical reaction;
c) allowing the exiting product to exit the vessel;
d) measuring a current system mass ($M_i$);
e) determining an exited mass ($E_i$) of the exiting product that exited during step c);
f) calculating a change in reactant mass ($\Delta M_i'$) that occurred based on the exited mass ($E_i$);
g) calculating a calculated temperature ($T_i$) according to:

$$T_i = 2T - \left(\alpha\left(\frac{M - \Delta M_i}{M}\right)T\right)$$

wherein $\alpha$ is a positive number that is less than 2;
h) adding additional reactants to the vessel in an amount equal to the change in reactant mass $\Delta M_i'$;
i) removing a portion of the inert component given by $R_i = \Delta M_i' - E_i$;
1 J) adjusting a temperature of the chemical system to the desired temperature (T) by adding or removing heat based on a temperature change between the calculated temperature ($T_i$) and the desired temperature (T); and
k) iteratively repeating steps c) to i).

* * * * *

UNITED STATES PATENT AND TRADEMARK OFFICE
CERTIFICATE OF CORRECTION

| | | |
|---|---|---|
| PATENT NO. | : 11,766,654 B2 | Page 1 of 1 |
| APPLICATION NO. | : 17/625275 | |
| DATED | : September 26, 2023 | |
| INVENTOR(S) | : Erlan H. Feria | |

It is certified that error appears in the above-identified patent and that said Letters Patent is hereby corrected as shown below:

In the Claims

Column 15, Lines 44 and 45, Claim 5 reading "wherein the step e) and d) are repeated" should be deleted Column 16, Line 22, Claim 9 reading "k) iteratively repeating steps c) to i)." should read as "k) iteratively repeating steps c) to j)."

Column 17, Line 22, Claim 12 reading "1 J) adjusting" should read as "j) adjusting."

Column 17, Line 26, Claim 12 reading "k) iteratively repeating steps c) to i)." should read as "k) iteratively repeating steps c) to j)."

Signed and Sealed this
Twenty-fourth Day of October, 2023

Katherine Kelly Vidal
*Director of the United States Patent and Trademark Office*